(12) United States Patent
Okel

(10) Patent No.: US 8,114,935 B2
(45) Date of Patent: Feb. 14, 2012

(54) MICROPOROUS PRECIPITATED SILICA

(75) Inventor: Timothy A. Okel, Trafford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 12/772,426

(22) Filed: May 3, 2010

(65) Prior Publication Data

US 2010/0292386 A1    Nov. 18, 2010

Related U.S. Application Data

(60) Provisional application No. 61/175,188, filed on May 4, 2009.

(51) Int. Cl.
C08K 3/34 (2006.01)
C01B 33/12 (2006.01)

(52) U.S. Cl. ........................... 524/492; 423/339

(58) Field of Classification Search .................... 524/492
See application file for complete search history.

(56) References Cited

U.S. PATENT DOCUMENTS

| | | |
|---|---|---|
| 5,342,598 A | 8/1994 | Persello |
| 5,705,137 A | 1/1998 | Goerl et al. |
| 5,968,470 A | 10/1999 | Persello |
| 6,013,234 A | 1/2000 | Ray et al. |
| 6,180,076 B1 | 1/2001 | Uhrlandt et al. |
| 7,566,433 B2 | 7/2009 | Stenzel et al. |
| 7,790,131 B2 * | 9/2010 | Stenzel et al. .............. 423/335 |
| 2006/0137575 A1 | 6/2006 | Stenzel et al. |
| 2007/0059232 A1 | 3/2007 | Stenzel et al. |
| 2008/0293871 A1 | 11/2008 | Stenzel et al. |

FOREIGN PATENT DOCUMENTS

EP        0 407 262 A1    6/1990

OTHER PUBLICATIONS

"The Chemistry of Silica", by R. K. Iler, p. 473, John Wiley & Sons (1979).

* cited by examiner

*Primary Examiner* — Ling Choi
*Assistant Examiner* — Hui Chin
(74) *Attorney, Agent, or Firm* — Deborah M. Altman; Frank P. Mallak

(57) ABSTRACT

Described herein is microporous precipitated silica having the following physico-chemical parameters: a CTAB surface area of 50 to 300 square meters/gram, a BET/CTAB ratio of $\geq 1.3$, and a relative breadth $\gamma$ of pore size distribution of $\leq 3.5$. The precipitated silica can also have a Sears number of from 10 to 28 and a Sears number/CTAB ratio of $\leq 0.16$. Also described herein are vulcanizable and vulcanized elastomer compositions, e.g., tires, containing the microporous precipitated silica.

19 Claims, No Drawings

MICROPOROUS PRECIPITATED SILICA

CROSS REFERENCE TO RELATED APPLICATIONS

This application claims priority to U.S. Application Ser. No. 61/175,188 filed May 4, 2009, which application is incorporated herein by reference in its entirety.

FIELD OF THE INVENTION

The present invention relates to precipitated silica with an increased amount of microporosity. The present invention further relates to vulcanizable and vulcanized elastomer mixtures in which the microporous precipitated silica is used as a reinforcing filler for the elastomer, and to the process for producing the microporous precipitated silica.

BACKGROUND OF THE INVENTION

Precipitated silica is a well-known white reinforcing filler that is used in vulcanizable elastomer compositions that are used in rubber applications, e.g., tires. It is known that generally in order to obtain optimum reinforcing properties, a filler used in elastomer mixtures should be present in a finely-divided form and distributed homogenously in the elastomer mixture. Many of the early precipitated silica materials used in elastomers had a tendency to agglomerate during incorporation into the vulcanizable elastomer mixture, which limited the level of reinforcement imparted to the elastomer by such silica.

Recently, precipitated silicas have been developed for use in what are known in the industry as "green tires", which has allowed a reduction in the rolling resistance of such tires compared to earlier silica-reinforced elastomers used in tires. However, the abrasion performance of the "green tire" has remained at approximately the level of a tire reinforced with only carbon black. With the increasing cost of raw materials and environmental pressures, there is a continuing need for further improvements in the rolling resistance of tires while also providing such tires with equal or improved abrasion resistance.

The CTAB surface area of precipitated silicas has been shown to correlate directly with reinforcement-related properties in elastomer mixtures. It is generally accepted that a higher CTAB surface area leads to improved abrasion resistance. However, higher CTAB surface areas have also been shown to increase the hysteretic properties of the cured elastomer mixture, i.e., the mechanic-dynamic loading of the cured elastomer mixture causes in the case of tires higher heat generation—a consequence of which is increased rolling resistance, which leads to poorer fuel efficiency.

It is also suggested that the structure, i.e., pores, formed within the precipitated silica during its preparation can have an impact on performance. Two measurements of this structure are the BET/CTAB surface area ratio of the precipitated silica, and the relative breadth ($\gamma$) of the pore size distribution of the precipitated silica. The BET/CTAB quotient is the ratio of the overall precipitated silica surface area including the surface area contained in pores only accessible to smaller molecules, such as nitrogen (BET), to the external surface area (CTAB) that is accessible to the elastomer, e.g., rubber, in which the silica is incorporated. This ratio is typically referred to as a measure of microporosity. A high microporosity value, i.e., a high BET/CTAB quotient number, is a high proportion of internal surface—accessible to the small nitrogen molecule (BET surface area) but not to the elastomer—to the external surface (CTAB) that is accessible to the elastomer. The relative breadth ($\gamma$) of pore size distribution is an indication of how broadly the pore sizes are distributed within the precipitated silica particle. The lower the $\gamma$ value, the narrower is the pore size distribution of the pores within the precipitated silica particle.

Finally, it is also known that the silanol groups on the surface of precipitated silica can impact its performance in elastomer mixtures. The Sears number is a measure that describes the concentration of silanol groups on the precipitated silica. One suggested parameter of precipitated silica is the concentration of silanol groups for a given level of CTAB surface area. The silanol groups on the precipitated silica surface function as potential chemical reaction sites for a coupling reagent, which permits coupling of the silica to the elastomer (rubber) matrix, which can lead to improved reinforcement properties, e.g., improved abrasion resistance. The silanol groups on the silica surface in elastomer mixtures also function as sites for particle-to-particle interactions. An increase in particle-to-particle interactions create increases in hysteretic properties, i.e., the mechanic-dynamic loading of the cured elastomer mixture results in higher heat generation, an example of the consequence being increased rolling resistance for tires, which leads to poorer fuel efficiency.

BRIEF SUMMARY OF THE INVENTION

It has now been found that precipitated silicas that have a certain combination of physico-chemical parameters will bring about an improvement in elastomer application-related properties. More particularly, it has been found that precipitated silicas having a combination of a given CTAB surface area, which provides a given level of reinforcement-related properties, increased microporosity, and a relatively narrow distribution of pore sizes will unexpectedly provide reduced hysteretic properties. It has also been found further that a certain range of silanol groups, particularly a minimum number of silanol groups for a given external surface area (CTAB), is beneficial in optimizing the hysteretic to reinforcement ratio, i.e., optimizing the fuel efficiency to abrasion resistance ratio. Still more particularly, it has been found that when such precipitated silica is incorporated as a filler into vulcanizable elastomer compositions, e.g., elastomer mixtures intended for use in rubber applications such as tires, it brings about a lower level of hysteresis, which results in lower rolling resistance of a tire prepared from such an elastomer mixture. Moreover, the physico-chemical parameters of such silica can also achieve a higher level of elastomer reinforcement, which provides for lower tire abrasion.

In accordance with the present invention, there is provided a microporous precipitated silica having a CTAB surface area of from 50 to 300 m$^2$/gram, a BET/CTAB surface area ratio of $\geq 1.3$, and a relative breadth $\gamma$ of pore size distribution of $\leq 3.5$. The precipitated silica further can be characterized by having a Sears number of from 10 to 28, and a Sears number/CTAB ratio of $\leq 0.16$.

In accordance with another aspect of the present invention, there are provided vulcanizable or vulcanized elastomer compositions wherein the previously described microporous precipitated silica is used as a filler for reinforcing the elastomer composition. The vulcanized elastomer composition can be used for the manufacture of tires, e.g., tire treads, which tires have reduced resistance to rolling and acceptable resistance to abrasion. In a further aspect of the present invention, the aforedescribed microporous precipitated silica is used as the principal reinforcing filler of the elastomer composition.

In accordance with a still further aspect of the present invention, there is provided a process for preparing the previously described microporous precipitated silica by acidification of an aqueous solution of an alkali metal silicate.

DETAILED DESCRIPTION OF THE INVENTION

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The precipitated silica of the present invention can have a CTAB surface area of from 50 to 300 $m^2$/gram. More particularly, the CTAB surface area can range from 150 to 250 $m^2$/gram, e.g., from 180 to 220 $m^2$/gram. The CTAB surface area values of the precipitated silica reported herein, have been measured in accordance with a modified ASTM D6845-02 method, which measures the external specific surface area by determining the quantity of cetyl trimethyl ammonium bromide (CTAB) adsorbed by the silica at a pH of 9.6 using a solution of the anionic surfactant Aerosol OT® as the titrant. In the modified ASTM D6845-02 method, the CTAB solution and silica are mixed for 35 minutes (not 40 minutes): and the method does not use octylphenoxy polyethoxyethanol (Triton X-100). Further, unlike other known CTAB measurement methods, which use filtration to separate the silica and CTAB solution, the modified ASTM D6845-02 method uses centrifugation. The quantity of CTAB adsorbed for a given weight of silica and the space occupied by the CTAB molecule are used to calculate the external specific surface area of the silica.

The silica CTAB values reported in the examples of this application were determined using a CTAB solution and the hereinafter described method. The analysis was performed using a Metrohm 751 Titrino automatic titrator, equipped with a Metrohm Interchangeable "Snap-In" 50 milliliter buret and a Brinkmann Probe Colorimeter Model PC 910 equipped with a 550 nm filter. In addition, a Mettler Toledo HB43 or equivalent was used to determine the 105° C. moisture loss of the silica and a Fisher Scientific Centrific™ Centrifuge Model 225 was used for separating the silica and the residual CTAB solution. The excess CTAB was determined by auto titration with a solution of Aerosol OT® until maximum turbidity was attained, which was detected with the probe colorimeter. The maximum turbidity point was taken as corresponding to a millivolt reading of 150. Knowing the quantity of CTAB adsorbed for a given weight of silica and the space occupied by the CTAB molecule, the external specific surface area of the silica was calculated and reported as square meters per gram on a dry-weight basis.

Solutions required for testing and preparation included a buffer of pH 9.6, cetyl [hexadecyl] trimethyl ammonium bromide (CTAB), dioctyl sodium sulfosuccinate (Aerosol OT) and 1N sodium hydroxide. The buffer solution of pH 9.6 was prepared by dissolving 3.101 g of orthoboric acid (99%; Fisher Scientific, Inc., technical grade, crystalline) in a one-liter volumetric flask, containing 500 milliliters of deionized water and 3.708 grams of potassium chloride solids (Fisher Scientific, Inc., technical grade, crystalline). Using a buret, 36.85 milliliters of the 1N sodium hydroxide solution was added. The solution was mixed and diluted to volume.

The CTAB solution was prepared using 11.0 g±0.005 g of powdered CTAB (cetyl trimethyl ammonium bromide, also known as hexadecyl trimethyl ammonium bromide, Fisher Scientific Inc., technical grade) onto a weighing dish. The CTAB powder was transferred to a 2-liter beaker and the weighing dish was rinsed with deionized water. Approximately 700 milliliters of the pH 9.6 buffer solution and 1000 milliliters of distilled or deionized water was added to the 2-liter beaker and stirred with a magnetic stir bar. A large watch glass was placed on the beaker and the beaker was stirred at room temperature until the CTAB powder was totally dissolved. The solution was transferred to a 2-liter volumetric flask, rinsing the beaker and stir bar with deionized water. The bubbles were allowed to dissipate, and the solution diluted to volume with deionized water. A large stir bar was added and the solution mixed on a magnetic stirrer for approximately 10 hours. The CTAB solution can be used after 24 hours and for only 15 days. The Aerosol OT® (dioctyl sodium sulfosuccinate, Fisher Scientific Inc., 100% solid) solution was prepared using 3.46 g±0.005 g, which was placed onto a weighing dish. The Aerosol OT on the weighing dish was rinsed into a 2-liter beaker, which contained about 1500 milliliter deionized water and a large stir bar. The Aerosol OT solution was dissolved and rinsed into a 2-liter volumetric flask. The solution was diluted to the 2-liter volume mark in the volumetric flask. The Aerosol OT® solution was allowed to age for a minimum of 12 days prior to use. The shelf life of the Aerosol OT solution is 2 months from the preparation date.

Prior to surface area sample preparation, the pH of the CTAB solution was verified and adjusted to a pH of 9.6±0.1 using 1N sodium hydroxide solution. For test calculations a blank sample was prepared and analyzed. 5 milliliters of the CTAB solution was pipetted and 55 milliliters deionized water was added into a 150-milliliter beaker and analyzed on a Metrohm 751 Titrino automatic titrator. The automatic titrator was programmed for determination of the blank and the samples with the following parameters: Measuring point density=2, Signal drift=20, Equilibrium time=20 seconds, Start volume=0 ml, Stop volume=35 ml, and Fixed endpoint=150 mV. The buret tip and the colorimeter probe were placed just below the surface of the solution, positioned such that the tip and the photo probe path length were completely submerged. Both the tip and photo probe were essentially equidistant from the bottom of the beaker and not touching one another. With minimum stirring (setting of 1 on the Metrohm 728 stirrer) the colorimeter was set to 100% T prior to every blank and sample determination and titration was initiated with the Aerosol OT® solution. The end point was recorded as the volume (ml) of titrant at 150 mV.

For test sample preparation, approximately 0.30 grams of powdered silica was weighed into a 50-milliliter container containing a stir bar. Granulated silica samples, were riffled (prior to grinding and weighing) to obtain a representative sub-sample. A coffee mill style grinder was used to grind granulated materials. Then 30 milliliters of the pH adjusted CTAB solution was pipetted into the sample container containing the 0.30 grams of powdered silica. The silica and CTAB solution was then mixed on a stirrer for 35 minutes. When mixing was completed, the silica and CTAB solution were centrifuged for 20 minutes to separate the silica and excess CTAB solution. When centrifuging was completed, the CTAB solution was pipetted into a clean container minus the separated solids, referred to as the "centrifugate". For sample analysis, 50 milliliters of deionized water was placed into a 150-milliliter beaker containing a stir bar. Then 10 milliliters of the sample centrifugate was pipetted for analysis into the same beaker. The sample was analyzed using the same technique and programmed procedure as used for the blank solution.

For determination of the moisture content, approximately 0.2 grams of silica was weighed onto the Mettler Toledo HB43 while determining the CTAB value. The moisture analyzer was programmed to 105° C. with the shut-off 5 drying criteria. The moisture loss was recorded to the nearest ±0.1%.

The external surface area was calculated using the following equation, $$CTAB \text{ Surface Area (dried basis) } [m^2/g] = \frac{(2V_o - V) \times (4774)}{(V_o W) \times (100 - Vol)}$$

wherein, $V_o$=Volume in ml of Aerosol OT® used in the blank titration.

V=Volume in ml of Aerosol OT® used in the sample titration.

W=sample weight in grams.

Vol=% moisture loss (Vol represents "volatiles").

The BET surface area of the precipitated silica of the present invention can vary, e.g., between 65 and 600 square meters per gram (m²/gram), such as between 170 and 380 m²/gram, e.g., between 220 and 340 m²/gram. In accordance with an aspect of the present invention, the BET value of the precipitated silica will be a value such that the quotient of the BET surface area in square meters per gram to the CTAB surface area in square meters per gram is equal to or greater than 1.3.

The BET surface area values reported in the examples of this application were determined in accordance with the Brunauer-Emmet-Teller (BET) method in accordance with ASTM D1993-03. The BET surface area can be determined by fitting five relative-pressure points from a nitrogen sorption isotherm measurement made with a Micromeritics TriStar 3000™ instrument. A flow Prep-060™ station provides heat and a continuous gas flow to prepare samples for analysis. Prior to nitrogen sorption, the silica samples are dried by heating to a temperature of 160° C. in flowing nitrogen (P5 grade) for at least one (1) hour.

The relative breadth γ of pore size distribution of the precipitated silicas of the present invention is ≦3.5, e.g., from 2.0 to 3.5, more particularly from 2.8 to 3.5. A description of the method used to determine the relative γ of pore size distribution can be found in U.S. Pat. No. 7,566,433 B2 in column 3, lines 1-31, and column 16, lines 6-63, which disclosure is incorporated herein in its entirety by reference. The pore volume of precipitated silicas is determined by mercury porosimetry. The method is based on Hg (mercury) intrusion to DIN 66133 (with surface tension of 480 mN/m and with a contact angle of)140° using Micromeritics Autopore IV 9500 equipment. A description of the analytical procedure for determining the relative breadth γ of the pore size distribution can be found in the Example section herein.

The nature of the pores of the precipitated silica, i.e., whether they are accessible to an elastomer, e.g., rubber, in which the silica is incorporated can be described by means of the BET/CTAB ratio. A high quotient is representative of microporosity and, therefore, a high proportion of internal surface—accessible to the small nitrogen molecule (BET surface area) but not to rubber. The BET/CTAB ratios of the microporous precipitated silicas of the present invention are ≧1.3, e.g., from 1.3 to 2.0, more particularly from 1.4 to 1.8.

In a further aspect of the present invention, the microporous precipitated silicas of the present invention have a modified Sears Number of from 10 to 28, e.g., from 15 to 25. The modified Sears Number is a measure of the number of silanol groups of the silica. See, for example, the text "The Chemistry of Silica", by R. K. Iler, page 473, John Wiley & Sons (1979). The modified Sears values reported in the examples herein were obtained by the method described in the Example section herein.

The ratio of the Sears Number to the CTAB surface area of the precipitated silica of the present invention is regarded as representing the reinforcement potential generated via the silanol groups of the silica per unit of external surface area introduced and therefore per unit of specific surface area accessible to the coupling agent used with the silica, as well as the potential to generate filler-filler interaction. The Sears Number/CTAB quotient of the precipitated silicas described herein is ≦0.16, e.g., from 0.08 to 0.16, more particularly from 0.12 to 0.15.

The precipitated silicas of the present invention can be produced by a process involving the following successive steps:

(a) an initial stock solution of aqueous alkali metal silicate having the desired alkalinity is prepared and added to (or prepared in) a reactor equipped with means for heating the contents of the reactor, (b) the initial stock solution within the reactor is heated to the desired reaction temperature, (c) acidifying agent and additional alkali metal silicate solution are simultaneously added with agitation to the reactor while maintaining the alkalinity value and temperature of the contents of the reactor at the desired values, (d) the addition of alkali metal silicate to the reactor is stopped, and additional acidifying agent is added to adjust the pH of the resulting suspension of precipitated silica to a desired acid value, (e) the precipitated silica in the reactor is separated from the reaction mixture, washed to remove by-product salts, and (f) dried to form the precipitated silica of the present invention.

The alkali metal silicate that is used in the aforedescribed process is typically chosen from sodium silicate and potassium silicate, usually sodium silicate. The solution of alkali metal silicate can contain from 0.1 to 20 wt % $SiO_2$, e.g., from 0.2 to 15 wt % $SiO_2$, such as from 0.3 to 10 wt % $SiO_2$. Expressed differently, the alkali metal silicate solution can have a concentration, expressed as silica, of between 40 and 330 g/l, e.g., from 60 to 250 g/l $SiO_2$. The alkali metal silicate stock solution can have a $SiO_2/M_2O$ molar ratio of from 0.1 to 3.9, e.g., from 1.6 to 3.9, such as from 2.9 to 3.5 or from 3.1 to 3.4, wherein M is sodium or potassium. When sodium silicate is used, the stock solution generally has a $SiO_2/Na_2O$ ratio of between 2 and 4, e.g., between 3.0 and 3.7, such as 3.2.

The alkalinity of the alkali metal silicate solution can vary. For example, the alkalinity (expressed as the AZ value) can vary between 5 and 40, e.g., between 10 and 30. More particularly, the AZ value can vary between 15 and 25, e.g., 20. Determination of the alkalinity of the alkali metal silicate solution, e.g., the sodium silicate solution, i.e., the AZ value, can be found in the Example section herein.

The initial alkali metal solution added to the precipitation reactor can be prepared external to the reactor and then added to the reactor, or water can be added to the reactor and the alkali metal silicate, e.g., sodium silicate, added to the reactor until the desired concentration of alkali metal silicate is obtained. The initial alkali metal silicate solution established in the precipitation reactor is sometimes referred to as the foreshot.

The initial alkali metal silicate solution can also contain a further electrolyte, e.g., an alkali metal salt. Generally, the electrolyte, if present, is the alkali metal salt of the acid used as the acidifying agent. For example, if sodium silicate and sulfuric acid are the reactants used, the electrolyte is sodium sulfate; and if hydrochloric acid and sodium silicate are the reactants used, the electrolyte is sodium chloride. If the electrolyte used is sodium sulfate, its concentration in the initial stock solution can be from 12 to 20 g/l, e.g., from 15 to 20 g/l. In the present method, the initial stock solution is substantially free of aluminum salts (inorganic or organic).

The reactor is equipped with heating means for heating the alkali metal silicate to the desired reaction temperature. For example, the reactor can be equipped with steam coils or external electrical bands. The temperature to which the reactor contents are heated can vary, but generally the temperature is in the range of from 20° C. to less than 100° C., e.g., from 30° C. to less than 100° C., such as from 65° C. to 98° C., particularly from 75° C. to 95° C., e.g., 80° C.

The acidifying agent used to react with the alkali metal silicate is generally a strong inorganic acid such as sulfuric acid, nitric acid or hydrochloric acid; however, an organic acid, such as carbonic acid (usually by the addition of gaseous carbon dioxide to the reaction media) can be used. Typically, sulfuric acid or hydrochloric acid is used. The acid can be dilute or concentrated; however, the Normality of the acid is generally between 0.4 and 8 Normal, e.g., from 0.6 to 1.5 Normal. When sulfuric acid is used, its concentration is usually between 40 and 180 g/l, e.g., between 60 and 130 gl. In an aspect of the foregoing process, 98 wt % aqueous sulfuric acid is used.

After establishing the alkali metal silicate solution foreshot in the reactor at the chosen reaction temperature and in accordance with the herein described process for preparing the precipitated silica of the present invention, alkali metal silicate reactant, e.g., sodium silicate, and acidifying agent, e.g., sulfuric acid, are added simultaneously with intensive agitation to the initial alkali metal silicate solution in the reactor. The alkalinity of the alkali metal silicate solution reactant is generally the same as that used to prepare the initial alkali metal silicate foreshot established in the reactor. The volume ratio of alkali metal silicate, e.g., sodium silicate, to acidifying agent, e.g., sulfuric acid, added to the reactor in this step can vary, but is generally in the range of between 5 parts of alkali metal silicate and 25 parts of alkali metal silicate to 1 part of acid, e.g., sulfuric acid, i.e., 5:1 to 25:1. In another aspect, the volume ratio of alkali metal silicate to acidifying agent can vary between 10 and 18 parts of alkali metal silicate to 1 part of acid, i.e., 10:1 to 18:1. The amount of alkali metal silicate added to the reactor during this step can vary, e.g., between 1 and 6 times the amount of alkali metal silicate in the foreshot.

During the simultaneous addition of the alkali metal silicate reactant and acidifying agent to the reactor, the temperature of the reaction mixture is maintained at approximately constant temperature, e.g., at substantially the desired reaction temperature; namely, the initial temperature to which the initial alkali metal silicate solution is heated. Further, the alkali metal silicate and acidifying agent are added simultaneously but in a manner such that the alkalinity (AZ value) of the contents in the reactor is maintained at substantially the same alkalinity value (AZ value) of the initial alkali metal silicate solution, i.e., the foreshot, for a time period that ranges generally from 0.25 to 1.5 hours, e.g., from 0.25 to 0.75 hours, which time period is measured from the beginning of the simultaneous addition step. Following this point in the process, the addition of alkali metal silicate and acidifying agent is controlled based on the pH of the reaction mixture.

The addition of alkali metal silicate and acidifying agent is continued until the selected amount of alkali metal silicate reactant is added to the reactor while adjusting the rate of acidifying agent addition so that the pH of the reaction mixture remains at or above the desired end pH for the simultaneous addition step. In an aspect of the described process, the pH remains at or above a pH of 9 during the this phase of the process. Usually, the end pH of the reaction mixture is between 9 and 9.7, e.g., approximately 9.5.

The simultaneous addition of alkali metal silicate and acidifying agent to the reactor is performed over a period of usually from 0.5 to 5 hours, e.g., from 1 to 3, such as 1.5, hours. During the simultaneous addition of alkali metal silicate reactant and acidifying agent, the pH of the contents of the reactor will gradually fall. When the pH of the reaction mixture has fallen to between approximately 9 and 9.7, e.g., approximately 9.5, and if the additional desired amount of alkali metal silicate has not been added to the reactor, the rate of acidifying agent addition is adjusted to maintain this end pH at the desired level until all of the additional alkali metal silicate is added. When all of the additional alkali metal silicate has been added, the step of simultaneously adding acid and alkali metal silicate reactant to the reactor is completed. The addition of alkali metal silicate reactant is discontinued at this time, but the addition of acidifying agent to the reactor is continued with strong (intense) agitation until the pH of the reaction mixture has been lowered to between 2.5 and 5, e.g., 4.

The resultant slurry of precipitated silica is separated, e.g., by a liquid/solid separation step, using conventional liquid—solid separation equipment and techniques to substantially separate the precipitated silica solids from the liquid reaction mixture. Non-limiting examples of separation techniques include filtration, centrifugation, decantation and the like. In a particular aspect of the process, the liquid/solid separation technique used is filtration, e.g., a filter press. Following separation, the separated silica solids are washed, e.g., with water, to remove by-product salts resulting from the acidification of the alkali metal silicate. Washing can be performed until the conductivity of the recovered wash liquor, e.g., the filtrate, is less than 2000 micro mhos/cm, e.g., from 500 to 1000 micro mhos/cm.

The washed silica solids are then dried using conventional drying techniques. Non-limiting examples of such techniques include oven drying, vacuum oven drying, rotary dryers, spray drying or spin flash drying. Non-limiting examples of spray dryers include rotary atomizers and nozzle spray dryers. Spray drying can be carried out using any suitable type of atomizer, in particular a turbine, nozzle, liquid-pressure or twin-fluid atomizer.

The washed silica solids may not be in a condition that is suitable for spray drying. For example, the washed silica solids may be too thick to be spray dried. In one aspect of the above-described process, the washed silica solids, e.g., the washed filter cake, are mixed with water to form a liquid suspension and the pH of the suspension adjusted, if required, with dilute acid or dilute alkali, e.g., sodium hydroxide, to from 6 to 7, e.g., 6.5, and then fed to the inlet nozzle of the spray dryer.

The temperature at which the silica is dried can vary widely but will be below the fusion temperature of the silica. Typically, the drying temperature will range from above 50° C. to less than 700° C., e.g., from above 100° C., e.g., 200° C., to 500° C. In one aspect of the above-described process, the silica solids are dried in a spray dryer having an inlet temperature of approximately 400° C. and an outlet temperature of approximately 105° C. The free water content of the dried silica can vary, but is usually in the range of from approximately 1 to 10 wt. %, e.g., from 4 to 7 wt. %. As used herein, the term free water means water that can be removed from the silica by heating it for 24 hours at from 100° C. to 200° C., e.g., 105° C.

In one aspect of the process described herein, the dried silica is forwarded directly to a granulator where it is compacted and granulated to obtain a granular product. Dried silica can also be subjected to conventional size reduction techniques, e.g., as exemplified by grinding and pulverizing. Fluid energy milling using air or superheated steam as the working fluid can also be used. The precipitated silica obtained is usually in the form of a powder.

The silica product exiting the granulator can have a wide distribution of particle sizes, e.g., between −5 and +325 Mesh. If subjected to a size reduction operation, the silica product can be subjected to a sizing operation, e.g., separated into conforming and non-conforming size materials by means, for example, of vibrating screens with appropriate mesh sizes. Non-conforming product can be recycled to the size reduction or compaction processes. The sized silica product can be separated into a product having size range of between −18 and +230 Mesh, e.g., between −60 and +100 Mesh. Mesh sizes are in accordance with ASTM E11 ASD.

In a particular aspect of the present invention, the above-described precipitated silicas are used as a filler in vulcanizable or vulcanized elastomer mixtures, e.g., in rubber applications. As used herein, the term elastomer and rubber are considered to be the same. When used in elastomer mixtures, the silica can be used in combination with organosilane materials. The use of such organosilanes is conventional and is well known to skilled artisans in the rubber/silica art. A description of typical organosilane materials can be found in U.S. Pat. No. 5,705,137 at column 3, lines 17 to 53, which description is incorporated herein in its entirety by reference.

Non-limiting examples of organosilanes that can be used with the precipitated silica of the present invention and elastomer mixtures include: bis(3-triethoxysilylpropyl) tetrasulfide; bis(3-triethoxysilylpropyl)disulfide; vinyltrimethoxysilane; vinyltriethoxysilane; 3-mercaptopropyltrimethoxysilane; 3-mercaptopropyltriethoxysilane; 3-aminopropyltriethoxysilane; and 3-aminopropyltrimethoxysilane.

The organosilane material may be added to the silica before addition to the elastomer mixture by reacting the organosilane with the surface of the silica to form a pre-modified silica by methods known to those skilled in the art. Generally, from 0.5 to 50 parts, e.g., from 1 to 15 parts, of the organosilane per 100 parts of silica is used to treat the surface of the silica. The reaction of the organosilane with the precipitated silica can be performed during preparation of the elastomer mixture or externally by spray application and subsequent thermal conditioning of the mixture. Alternatively, the organosilane can be added to the elastomer mixture along with the silica. In the latter case, the organosilane reacts with the surface of the silica in situ during the mixing process.

The precipitated silica of the present invention can be added to vulcanizable elastomer mixtures in amounts of from 5 to 100 parts, e.g., from 15 to 60 parts, of silica to 100 parts of elastomer. The silica can be in the form of a powder, microbead or granule with or without silane modification. The elastomers with which the silica is mixed can be those natural and synthetic elastomers (oil extended or non-oil extended) that can be cross-linked (vulcanized/cured) with accelerator/sulfur or peroxides, as listed in DIN/ISO 1629. Non-limiting examples of such elastomers include: natural and synthetic rubbers, polybutadiene rubber, polyisoprene rubber, butadiene/styrene copolymer rubber, e.g., SBR rubber, butadiene/acrylonitrile rubber, butyl rubber, terpolymers of ethylene, propylene and non-conjugated dienes, e.g., EPDM rubber, halogenated butyl rubber, silicone rubber, and 2-chlorobutadiene rubber. Mixtures of such elastomers are contemplated herein.

The silica/elastomer mixture can further contain other fillers, e.g., reinforcing and non-reinforcing fillers. Non-limiting examples of such fillers can include carbon black, e.g., furnace black, gas black, lamp black, and acetylene black, natural fillers such as clay and siliceous chalk, natural silicates such as kaolin and other naturally occurring silicon dioxide compounds, pyrogenic silicas and precipitated silicas other than the microporous precipitated silicas of the present invention. In an aspect of the present invention, it is contemplated that the microporous precipitated silica described herein are used as the principal reinforcing filler of the elastomer mixture. However, it can be used to supplement another filler(s) that are used as the principal reinforcing filler(s).

Likewise, the silica/elastomer mixture can contain further adjuvants known to those skilled in the art, such as plasticizers, tackifiers, blowing agents, thermal stabilizers, light protection agents, antiozidants, activators, reaction accelerators, pigments, colorants, anti-aging inhibitors, retardants and processing auxiliary agents, in amounts conventional to the particular elastomer (rubber) mixture. The usual quantities are, for example, quantities of from 0.1 to 50 wt. % in relation to the elastomer.

Sulfur or sulfur donating materials can be used as vulcanizing agents (in amounts of from 0.1 to 10 wt. %, e.g., 1 to 3 wt. %, based on the amount of the elastomer). Non-limiting examples of vulcanization accelerants include mercaptobenzthiazoles, sulfonamides, and thiurams, dithiocarbamates (in amounts of from 0.5 to 3 wt. %). Non-limiting examples of co-accelerants are guanidienes, thioureas and thiocarbonates (in amounts of from 0.5 to 5 wt. %).

The vulcanized silica/elastomer compositions can be used in conventional rubber applications such as in tires, e.g., tires for automobiles, utility vehicles, motorcycles, buses, trucks and trailers, tires for off-road vehicles such as construction, agricultural and mining vehicles, conveyor belts, seals, V-belts, hoses, shoe soles, roller coverings, cable sheaths, damping elements, etc. The vulcanized silica/elastomer compositions can be used to prepare any appropriate portion of the tire, e.g., the tread, side wall or other portion of the tire carcass. The rubber vulcanizates can be prepared by methods commonly used in the rubber industry; namely, by mixing the elastomer, filler and auxiliaries on a closed mixer, mixer-extruders or open roll mills, usually at temperatures of from 100° C. to 200° C., e.g., from 130 to 180° C.

The present invention is more particularly described in the following examples, which are intended to be illustrative only, since numerous modifications and variations therein will be apparent to those skilled in the art. Unless otherwise specified, all parts and all percentages are by weight.

EXAMPLES

In Part 1 of the Examples, the preparation of the microporous precipitated silica of the present invention is described in the "foreshot" and "simultaneous addition" phases detailed in Tables 1 and 2. The final pH adjustment and post precipitation processing conditions are described in Table 3.

In Part 2 of the Examples, the properties of the silica and testing methods are described in Table 4.

In Part 3 of the Examples, the preparation of model passenger tire formulations is described and detailed in Table 5, and the tire test results for Tangent Delta @ 60° C. are listed in Table 6.

Part 1—Precipitated Silica Preparation

A summary of the key variables for the production of Examples 1-4 and 4A is shown in Tables 1, 2 and 3. Stock aqueous sodium silicate (SS) solutions were prepared containing 70 grams of $Na_2O$ per liter and having a $SiO_2:Na_2O$ molar ratio of 3.2:1. Syntheses conditions described as the "foreshot" phase in Table 1 were conducted either in a 150-liter reactor equipped with steam coils for heating or a 757-liter reactor equipped with electrical bands for heating. Both reactors were also equipped with an inlet for the sodium silicate solution, an inlet for acid, an outlet, a primary agitator, and a supplemental high speed agitator located near the site of acid addition.

The "foreshot" was established by charging the reactor with the amount of water indicated and heating it to the listed temperature. Over a 30 minute period of time, the amount of stock aqueous sodium silicate solution (SS) was added with agitation provided by the primary agitator, such that the AZ number as well as the concentration of $Na_2O$ in the solution in the reactor equaled the values reported in Table 1.

The "simultaneous addition" phase began while maintaining each of the sodium silicate solutions in the reactors at the indicated temperatures. With both agitators running, separate streams of stock aqueous sodium silicate solution (SS) and 96 weight percent aqueous sulfuric acid were simultaneously added over a period of 90 minutes. The amounts of the stock aqueous sodium silicate solution and 96 weight percent aqueous sulfuric acid added during this phase are indicated in Table 2. The AZ values listed in Table 2 were the same level measured after 10, 20 and 30 minutes of the start of the addition of both the stock aqueous sodium silicate solution and the 96 weight percent aqueous sulfuric acid. Upon completion of the additions of both the stock aqueous sodium silicate solution and the 96 weight percent aqueous sulfuric acid, the supplemental high speed mixer was shut off. The pH of the solution at this point, for each example, was 9.5.

The final pH adjustment was done with the supplemental high speed mixer on. The amount of 96 weight percent aqueous sulfuric acid was added over the period of time (Add Time) to obtain the pH of the reaction mixture listed in Table 3. The reaction mixture was filtered in a filter press. The filter cake was washed with water until the conductivity of the filtrate had dropped to the conductivity listed. Water was added to each of the wet filter cakes and the resulting combinations were mixed with a Cowles blade to form a solid in liquid suspension containing the percent solids by weight listed in Table 3. The pH of this suspension was adjusted if required with dilute caustic or sulfuric acid to the values indicated under Spray Drying. The suspensions were dried in a Niro spray drier (inlet temperature about 400° C.; outlet temperature about 105° C.). A portion of the silica of Example 4 was processed under different conditions as listed for Example 4A in the Spray drying step to produce an additional example. The moisture of the spray dried powders was in the 4-7 weight percent range. The spray dried powders were granulated using an Alexanderwerk WP 120×40 Roller Compactor using a feed screw speed of 54.5 rpm, a roll compactor speed of 4.6 rpm, a crusher speed of 55.0 rpm, a screen gap of 1.5 mm, a vacuum pressure of 26.2 BAR and at the granulation pressures indicated in Table 3.

TABLE 1

Foreshot

| Example # | Reactor (L) | City Water, (L) | SS, (L) | $AZ^{(1)}$ | $Na_2O^{(2)}$, (g/L) | Temp, (° F. (° C.)) |
|---|---|---|---|---|---|---|
| 1 | 150 | 95 | 9.0 | 20.2 | 6.3 | 176 (80) |
| 2 | 150 | 95 | 8.0 | 20.0 | 6.4 | 173 (78.3) |
| 3 | 757 | 475 | 47.7 | 19.3 | 6.4 | 174 (78.9) |
| 4 | 150 | 95 | 9.0 | 20.0 | 6.5 | 1706.7) |

$^{(1)}$The AZ value is a measure of the alkalinity of a sample from the reactor obtained by the following method: A 50 mL sample was transferred into a 400 mL beaker having a magnetic stir bar to which about 100 mL of deionized water was added. The resulting mixture was stirred moderately on a magnetic stir plate and 6 drops of a phenolphthalein indicator [Catalog SP 62-1, Fisher Scientific] was added. The color of the solution was pink. The solution was titrated with 0.645N HCl from a 50 mL burette until the color of the solution cleared. The mL of titrant was recorded and used in the following equation to determine the AZ value.

AZ value = (mL of 0.645N HCl) × (64.5)

$^{(2)}Na_2O$ is the alkaline portion of the sodium silicate. The determination of the grams per liter of $Na_2O$ within a sample was determined through titration with methyl orange-xylene cyanole indicator using the following procedure. A 20 mL sample was transferred into a 400 mL beaker having a magnetic stir bar to which 100 mL of deionized water was added. The beaker was placed on a magnetic stir plate and the sample was stirred at a moderate speed. Approximately 10 drops of the Methyl Orange-Xylene Cyanole indicator from Acros Organics was added and the color of the solution became green. The solution was titrated with 0.645N HCl from a 50 ml burette until the color of the solution turned purple. the amount of 0.645N HCl added in milliliters equals the value in grams per liter of $Na_2O$ in the sample.

TABLE 2

Simultaneous Addition

| Example # | SS, (L) | $H_2SO_4$, (mL) | $AZ^{(1)}$ | Temp, (° F. (° C.)) |
|---|---|---|---|---|
| 1 | 25.0 | 1540 | 20.5 | 176 (80) |
| 2 | 32.5 | 2800 | 20 | 173 (78.3) |
| 3 | 97.4 | 8231 | 20 | 175 (79.4) |
| 4 | 33.0 | 2060 | 20 | 170 (76.7) |

TABLE 3

| | Final pH Adjustment | | | Wash Final Filtrate | Spray Drying | | Granulation |
|---|---|---|---|---|---|---|---|
| Example # | $H_2SO_4$, (mL) | pH | Add Time, min | Conductivity, micromhos/cm | Slurry Solids, wt. % | pH | Pressure, BAR (megapascal) |
| 1 | NA | 4.0 | 19 | 552 | 13.0 | 6.5 | 20 (2) |
| 2 | 750 | 4.0 | 10 | 994 | 10.6 | 6.4 | 20 (2) |
| 3 | 2941 | 4.0 | 24 | 929 | 14.3 | 6.1 | 3 (0.3) |
| 4 | 500 | 4.0 | 9 | 975 | 10.6 | 6.4 | 11 (1.1) |
| 4A | NA* | NA | NA | NA | 9.5 | 6.4 | 20 (20) |

*NA indicates that the data is Not Available

Part 2—Example Properties

Comparative Examples (CE) 1 through 3 are available from PPG Industries, Inc. Comparative Example 1 is Hi-Sil® EZ 160 G-D, Comparative Example 2 is a non-commercial silica product identified by PPG Industries, Inc. as DXR-194. Comparative Example 3 is Hi-Sil® 190 G.

TABLE 4

Properties of the Examples and Comparative Examples

| Example # | $\gamma^{(3)}$, (g nm/mL) | Sears$^{(4)}$, mL (PtOH)/5 g | Sear$^{(4)}$/CTAB$^{(5)}$ (mL/5 m$^2$) | CTAB$^{(5)}$ m$^2$/g | $N_2$ (BET)$^{(6)}$, m$^2$/g | $N_2$ (BET)$^{(6)}$/ CTAB$^{(5)}$ |
|---|---|---|---|---|---|---|
| 1 | 3.07 | 31.0 | 0.19 | 166 | 274 | 1.65 |
| 2 | 3.46 | 24.5 | 0.15 | 164 | 277 | 1.69 |
| 3 | NA* | NA | NA | 192 | 273 | 1.42 |
| 4 | NA | NA | NA | 189 | 273 | 1.44 |
| 4A | 2.85 | 26.8 | 0.14 | 186 | 298 | 1.60 |
| CE-1 | 2.37 | 45.0 | 0.28 | 161 | 163 | 1.01 |
| CE-2 | NA | 22.3 | 0.12 | 190 | 214 | 1.13 |
| CE-3 | 2.32 | 21.4 | 0.12 | 169 | 187 | 1.10 |

*NA indicates data not available

[3] The symbol "γ" represents the relative breadth of the pore size distribution of silica. It was determined by means of mercury porosimetry using the following procedure: Each sample was first prepared by subjecting the silica material to approximately one metric ton of force using a manual press. The compression was accomplished by using a Carver Manual press Model "C"(SN# RMS 3947) with a 16 mm diameter stainless steel compression vessel and approximately 0.25 g of the "as received" sample. The sample was compacted at one metric ton for approximately 5 seconds. The compressed silica was tapped from the compression vessel into a sample container for shipment to Micromeritics Analytical Services, Norcross, GA for mercury porosimetry analysis. The total compressed sample weight shipped for analysis was approximately 1.25 g. The samples were dried at 105 ± 2° C. for at least 4 hours prior to analysis. The laboratory utilized an AutoPore ® IV 9500 for mercury porosimetry determinations using software version 1.09, a mercury surface tension of 480 mN/m and a mercury contact angle of 140°.
The starting weight of silica placed in the type 10 Penetrometer, having an accuracy of 0.001 g, was selected for good reproducibility of the measurement, in such a way that the "stem volume used", i.e. the percentage Hg volume consumed for filling of the penetrometer was from 20% to 40%. The Penetrometer was then slowly evacuated to 50 μm of Hg and kept at this pressure for 5 min.
The AutoPore ® equipment was operated using Software Version IV 1.09. Each measurement was corrected by a measurement of the Penetrometer under empty conditions. The measurement range was from 0.0025 to 420 MPa, and at least 136 equilibrium measurement points (equipment-specific criterion of 10 s) were used (in the range from 0.0025 to 0.25 MPa: 30 points, in the range from 0.25 to 15 MPa: 53 points, in the range of 15 to 150 MPa: 40 points, in the range from 150 to 420 MPa: 13 points).
If appropriate, the software introduced further measurement points if the incremental intrusion volume was >0.04 ml/g. The intrusion curve was smoothed by means of the "smooth differentials" function of the equipment software. The Log Differential Intrusion (mL/g) versus pore size data provided by Micrometrics was analysed in the pore diameter rang from 3.5 nm to 5 μm. To determine the relative breadth γ of the pore size distribution, an algorithm that utilized a movable window starting from large pore diameters and composed of three successive measurement points of the Log Differential Intrusion curve, that drew a parabola through the points. The maximum of the parabola was defined as the required maximum "A" for a pore diameter "a".
A check was carried out as to whether the point "a" was within the required pore diameter range and represented the global maximum of the Log Differential Intrusion curve. If that was not the case, the window was shifted by one point, a fresh parabola was drawn through the points, and the procedure was repeated until both criteria were met. "B" was then defined as 0.300 × "A" and "b" represented that pore diameter of the curve which is smaller than "a", and at which the value "B" was achieved for the first time.
Finally, the relative breadth γ of the pore size distribution was defined as $\gamma = (a - b)/(A - B) = (a - b)/(0.7 \times A)$, where a and b were in nanometer units and γ was in the unit (g nm)/ml.
[4] The modified Sears number is a measure of the number of free silanol groups determined via titration of silica with potassium hydroxide solution in the range from pH 6 to pH 9 according to the following procedure: 10.00 g of Example 1-4, 4A and CE 1-3, each having a moisture level of 5 ± 1%, was transferred to a suitable glass container and placed in a oven at 105° C. for 2 hours. The container was removed from the oven and placed in a dessicator until analyzed.
2.50 g of the resultant treated silica was weighed out at room temperature into a 250 mL titration vessel and mixed with 60.0 mL of methanol (analytical grade). Once the specimen was completely wetted, 40.0 mL of deionized water was added. A Teflon coated stir bar was added to the titration vessel and the container was placed on a stir plate for 30 seconds to disperse the silica and methanol/water solution. Deionized water (100 mL) was used to flush the specimen particles adhering to the edge of the vessel into the suspension.
The temperature of the sample was measured and allowed to come to room temperature.
The pH measurement device (Orion 720A+ Advanced ISE/pH/mV/ORP Meter S/N 091957 Thermo Electro Corporation) and the pH electrode (Orion Ross pH Electrode 5600) were calibrated by using buffer solutions (pH 4.00, 7.00 and 9.00) at room temperature. The pH meter was first used to measure the starting pH value of the suspension at room temperature, and then, as a function of the result, either potassium hydroxide solution (0.1N) or hydrochloric acid solution (0.1N) was used to adjust the pH value to 6.00.
A dynamic titration method was used with the following parameters: incremental titration volume $V_{min} = 0.05$ ml to $V_{max} = 1.0$ ml; waiting time between volume additions $t_{min} = 2.0$ s to $t_{max} = 20.0$ s. A Brinkman 665 Dosimat w/digital output S/N 6F7/276 Calibration Exp. 11/18/10 and Brinkman 806 Buret w/20 ml buret S/N 77687 Calibration Exp. 11/19/10 were used for the dynamic titration.

TABLE 4-continued

Properties of the Examples and Comparative Examples

| Example # | $\gamma^{(3)}$, (g nm/mL) | Sears[4], mL (PtOH)/5 g | Sear[4]/CTAB[5] (mL/5 m²) | CTAB[5] m²/g | $N_2$ (BET)[6], m²/g | $N_2$ (BET)[6]/ CTAB[5] |
|---|---|---|---|---|---|---|

After adjustment of the pH to 6.00, 20.0 ml of sodium chloride solution (250.00 g of NaCl (analytical grade) made up to 1 L with deionized water was added. KOH (0.1N) was then used for titration to a pH value of 9.00. Consumption of KOH solution in mL to pH 9.00 is $V_{2'}$. The titration with 0.1N KOH was continued until the pH of the solution was maintained for 60 seconds.
The volume of KOH was recorded and the Sears number determined by the following calculation: The volume $V_{2'}$ was first standardized to the theoretical starting weight of 1 g, and then multiplied by 5, to give the Sears number $V_2'$ in the units mL/(5 g).
[5]The CTAB value is a measure of the external specific surface area by determining the quantity of CTAB (CetylTrimethylAmmonium Bromide) after adsorption at a pH 9.6, using a solution of the anionic surfactant Aerosol ® OT as the titrant. The CTAB values reported herein were measured in accordance with a modified ASTM D6845-02 method, in which the modified ASTM D6845-02 mixes the CTAB and silica solution for 35 minutes not 40 and does not use octylphenoxy polyethoxyethanol known as Triton ® X-100.
[6]The BET value is a measure of the surface area determined by the Brunauer, Emmett, and Teller (BET) method in accordance with ASTM D1993-03. The BET surface area was determined by fitting five relative-pressure points from a nitrogen sorption isotherm measurement made with a Micromeritics TriStar 3000 instrument. A FlowPrep-060 ™ station provided heat and a continuous gas flow to prepare samples for analysis.
Prior to nitrogen sorption, the silica samples were dried by heating to a temperature of 160° C. in flowing nitrogen )P5 grade) for at least one (1) hour.

Part 3-Tire Formulation Testing

The model passenger tread formulation used to compare Examples 1-4 and 4A to Comparative Examples 1-3 is shown in Table 5. A portion of each example and comparative example was added individually as Silica 1 and Silica 2 in PASS 1 to produce the rubber samples subjected to Tangent Delta @ 60° C. testing reported in Table 6.

A 1.89 liter (L) Kobelco Stewart Bolling Inc. mixer (Model "00") equipped with 4 wing rotors and a Farrel 12 inch two-roll rubber mill were used for mixing the ingredients following ASTM D3182-89. The formulations were mixed using two non-productive passes and sheeted off between each pass to 0.085 inches (2.16 mm). The material was allowed to cool for at least one hour between passes and followed by a mill finish on a two roll mill.

For the first pass, the mixer speed was adjusted to 85 rpm and both the solution SBR, Buna VSL 5228-2 (vinyl content: 52%; styrene content: 28%; TDAE oil content: 37.5 phr; Mooney viscosity (ML(1+4)100° C.): 50) obtained commercially from LANXESS, and BR, Budene™ 1208 (vinyl content: 1.5%; cis 1,4 content 98%; Mooney viscosity (ML(1+4)100° C.): 46) obtained commercially from The Goodyear Tire & Rubber Company, polymers were added to the mixer. After 50 seconds into the mix cycle the mixer speed was reduced to 70 rpm. After another 50 seconds into the mix cycle approximately two thirds of the test silica as SILICA 1 and all of the X50-S, a 50/50 blend of 3,3'-bis(triethoxysilylpropyl)tetrasulfide with carbon black obtained commercially from Palmer Holland, is added to the mixer. After another 25 seconds into the mix cycle, the ram was raised and the chute swept, i.e., the covering on the entry chute was raised and any material that was found in the chute was swept back into the mixer. After another 45 seconds into the mix cycle the remaining approximately one third of the test silica, and all of the Sundex® 790 aromatic hydrocarbon processing oil, obtained commercially from R.E. Carrol Inc., all of the Rubber grade stearic acid, obtained commercially from R.E. Carroll and all of the Okerin® 7240 microcrystalline wax/paraffin wax blend obtained commercially from Sovereign Chemical Company are added to the mixer. After another 10 seconds, the ram was raised and the chute swept. After another 90 seconds, or when the mix temperature reached 320° F. (160° C.), the speed was increased to 105 rpm. The first pass was dropped when a drop temperature of 160° C. was reached which was approximately 300 seconds of total mix time.

For the second pass the mixer speed was adjusted to 105 rpm and the cooled 1$^{st}$ pass Masterbatch was added. After 50 seconds into this second mix cycle all of the Santoflex® 13 antiozonant, described as N-(1,3-dimethylbutyl)-N'-phenyl-p-phenylenediamine, obtained commercially from Flexsys and all of the Kadox® surface treated zinc oxide, obtained commercially from Zinc Corporation of America were added to the mixer. After another 50 seconds into this second mix cycle the ram was raised and the chute swept and the mixer speed adjusted to 120 rpm. The second pass was dropped when a drop temperature of 160° C. was reached which was approximately 240 to 260 seconds of total second pass mix time.

All of the Rubber Makers (RM) sulfur, 100% active, obtained commercially from Taber, Inc., all of the Santocure CBS, n-cyclohexyl-2-benzothiazolesulfenamide obtained commercially from Flexsys, a division of Solutia Inc., and all of the diphenylguanidine, obtained commercially from Harwick Standard Inc., were blended into the cooled second pass Masterbatch on a two-roll rubber mill. Milling was done for approximately 5 minutes performing 5 side cuts and 5 end passes.

The sheet stock collected off the mill was placed on a flat clean surface. Using a stencil, a rectangular sample 203.2 mm×152.4 mm (8 inches×6 inches) was cut from the sheet stock. The sample was conditioned, i.e., stored between clean polyethylene sheets and maintained for 15 to 18 hours at a temperature of 23°±2° C., and a relative humidity of 50%±5%.

After conditioning, the sample was placed in a 203.2 mm×152.4 mm×2.286 mm (8 inch×6 inch×0.09 inches) standard frame machine steel compression mold having a polished surface. The sample was cured in a 61 centimeter×61 centimeter (24 inch×24 inch) 890 kiloNewtons (100 ton) 4-post electrically heated compression press, for T90, i.e., the time it takes for 90 percent of the cure to occur, in accordance with ASTM D-2084, plus 5 minutes at 150° C. (302° F.) under a pressure of 13.79 megaPascals (2000 pounds per square inch). Typically, curing was completed within about 10 minutes. The resulting cured rubber sheet was removed from the mold and maintained for 15 to 18 hours at a temperature of 23°±2° C. (73.4±3.6° F.), and a relative humidity of 50%±5% prior to Tangent Delta testing.

Tangent Delta @ 60° C. was determined following ASTM D5992-96 in parallel plate geometry using a Rheometrics Dynamic Spectrometer (RDS-II) at 1 Hertz and 2% strain. Test specimens were cured for $T_{90}$+10 minutes. Tangent Delta @ 60° C. results are tabulated in Table 6.

TABLE 5

Model Passenger Tread Formulation

| | Additions | Weight, grams |
|---|---|---|
| Mix Program Step | | |
| PASS 1 | | |
| POLYMERS | VLS 5228-2 | 502.0 |
| | BR 1208 | 121.7 |
| SILICA 1 | Silica | 260.0 |
| | X50-S | 62.3 |
| SILICA 2 | Silica | 129.5 |
| | Sundex 790 | 21.4 |
| | Stearic Acid | 4.9 |
| | Paraffin wax | 7.3 |
| | Subtotal wt: | 1109.1 |
| Mix Program Step | | |
| PASS 2 | | |
| M/B - ADDITIVES | Master-batch | 1109.1 |
| | Santoflex 13 | 9.7 |
| | Zinc Oxide | 12.2 |
| | Subtotal wt: | 1131.0 |
| MILL FINISH | | |
| | Master-batch | 1131.0 |
| | RM Sulfur | 6.8 |
| | Santocure CBS | 8.3 |
| | DPG | 9.7 |
| | 18 END PASSES | |
| | Total wt: | 1155.8 |

TABLE 6

Tangent Delta @ 60° C. Results from Model Passenger Tread Formulation

| | Ex. 1 | Ex. 2 | CE-1 | Ex. 3 | Ex. 4 | Ex. 4A | CE-2 |
|---|---|---|---|---|---|---|---|
| Tangent Delta | 0.132 | 0.131 | 0.144 | 0.141 | 0.142 | 0.134 | 0.159 |

It has been well established that for tire applications rolling resistance corresponds to deformation at a certain frequency and temperature while skid or wet grip is generated by the resistance from the road surface and movement of the rubber at or near the surface of the tire tread at a different frequency and temperature. Since certain tire properties involve frequencies which are too high to be measured the time-temperature equivalence principle is used to convert the actual field conditions into a laboratory measureable rate and temperature. Historically, tangent delta has been most frequently used as a relevant dynamic property of the material for hysteretic energy-loss processes. Tangent delta at higher temperatures, e.g. 60° C., and measureable frequency has often been used to predict rolling resistance.

The tangent delta (tan delta) results at 60° C. are shown in Table 6. Analysis of these results show the following:

A comparison of the tan delta results for examples CE-1 and CE-2 confirm the expected result of increasing surface area, e.g., increased CTAB surface area, at relatively constant microporosity leads to increased hysteretic properties, i.e., increased rolling resistance which leads to reduced fuel efficiency;

A comparison of the tan delta results for examples. 1 and 2 with example CE-1 (as well as for examples 3, 4 and 4A with example CE-2) show the unexpected result that increasing microporosity with a relatively narrow breadth of pore size distribution and minimum silanol concentration leads to reduced hysteretic properties, thereby leading to better fuel efficiency at a given amount of surface area (CTAB), which predicts a constant reinforcement, e.g., abrasion resistance;

A comparison of the tan delta results for examples 3 and 4 to example CE-1 shows the unexpected result of combining increased surface area (CTAB) with increased microporosity, a relatively narrow breadth of pore size distribution and minimum silanol concentration, to provide equal hysteretic properties (as shown by tan delta @ 60° C.), which predicts equal rolling resistance or fuel efficiency; and A comparison of the tan delta results for example 4A to example CE-1 shows the unexpected result of combining increased surface area (CTAB), which predicts an increase in reinforcement, e.g., abrasion resistance, with increased microporosity, a relatively narrow breadth of pore size distribution and minimum silanol concentration, to provide lower hysteretic properties (as shown by tan delta @ 60° C.), which predicts lower equal rolling resistance or better fuel efficiency.

The present invention has been described with reference to specific details of particular embodiments thereof. However, it is not intended that such details be regarded as limitations upon the scope of the invention except insofar as and to the extent that they are included in the accompanying claims.

What is claimed is:

1. Precipitated silica characterized by the following physicochemical parameters:

| CTAB surface area of: | 50-300 m²/g |
|---|---|
| BET/CTAB ratio of: | ≧1.3 |
| Relative breadth γ of pore size distribution: | ≦3.5 (g nm)/ml. |

2. Precipitated silica according to claim 1 further characterized by the following physicochemical parameters:

| a. Sears number of: | 10-28 |
|---|---|
| b. Sears number/CTAB ratio of: | ≦0.16. |

3. Precipitated silica according to claim 1 wherein the physico-chemical parameters are:

| a. CTAB surface area of: | 150-250 m²/g |
|---|---|
| b. BET/CTAB ratio: | 1.3-2.0 |
| c. Relative breadth γ of pore size distribution of: | 2.0-3.5 (g nm)/ml. |

4. Precipitated silica according to claim 3 further characterized by the following physico-chemical parameters:

| a. Sears number of: | 15-25 |
|---|---|
| b. Sears number/CTAB ratio of: | 0.08-0.16. |

5. Precipitated silica according to claim 4 wherein the CTAB surface area is from 180 to 220 m²/g, the BET/CTAB ratio is from 1.4 to 1.8, the relative breadth γ of the pore size distribution is from 2.8 to 3.5 (g nm)/ml, and the Sears number/CTAB ratio is from 0.12 to 0.15.

6. A vulcanized elastomer composition having a filler for reinforcement wherein the reinforcing filler is precipitated silica having the physico-chemical parameters of claim 1.

7. A vulcanized elastomer composition having a filler for reinforcement wherein the reinforcing filler is precipitated silica having the physico-chemical parameters of claim 2.

8. The vulcanized elastomer composition of claim 1 wherein the precipitated silica is used as the principal reinforcing filler.

9. A vulcanized elastomer composition having a filler for reinforcement wherein the reinforcing filler is precipitated silica having the physico-chemical parameters of claim 3.

10. A vulcanized elastomer composition having a filler for reinforcement wherein the reinforcing filler is precipitated silica having the physico-chemical parameters of claim 4.

11. A vulcanized elastomer composition having a filler for reinforcement wherein the reinforcing filler is precipitated silica having the physico-chemical parameters of claim 5.

12. A road tire having reduced resistance to rolling wherein at least a portion of the tire is prepared from the vulcanized elastomer of claim 6.

13. The road tire of claim 12 wherein the tire tread of the road tire is prepared from the vulcanized elastomer of claim 6.

14. A method for preparing microporous precipitated silica having the following physic-chemical parameters: CTAB surface area of 50-300 $m^2/g$, BET/CTAB ratio of $\geq 1.3$ and relative breadth of $\gamma$ of pore size distribution of $\leq 3.5$ (g nm)/ml, the method comprising:
   a. establishing an initial aqueous alkali metal silicate solution in a reaction vessel, the alkali metal silicate solution having an AZ alkalinity of from 5 to 40 and a temperature of from 20° C. to less than 100° C.,
   b. adding simultaneously and with agitation alkali metal silicate and acidifying agent to the reaction vessel until the pH of the resulting reaction mixture is between 9 and 9.7, the amount of alkali metal silicate added in this step (b) being from 1 to 6 times the amount present in the initial alkali metal silicate solution of step (a),
   c. terminating the addition of alkali metal silicate to the reactor,
   d. continuing the addition of acidifying agent until the pH of the reaction mixture is between 2.5 and 5,
   e. separating the precipitated silica solids from the reaction mixture,
   f. washing the recovered precipitated silica solids until the conductivity of the wash liquor is less than 2000 micro mhos/cm, and
   g. drying the washed precipitated silica.

15. The process of claim 14 wherein the alkali metal silicate is sodium silicate, the alkalinity of the sodium silicate solution is from 15 to 25, the acidifying agent is sulfuric acid, and the temperature of the solution is from 75° C. to 95° C.

16. The process of claim 14 wherein the alkali metal silicate and acidifying agent are added simultaneously over a period of from 0.5 to 5 hours, in a volume ratio of between 5 and 25 parts of alkali metal silicate to 1 part of acidifying agent.

17. The process of claim 16 wherein the temperature and AZ alkalinity of the contents of the reactor during simultaneous addition of the alkali metal silicate and acidifying agent are maintained substantially at the initial AZ alkalinity and temperature for from 0.25 to 1.5 hours.

18. The process of claim 15 wherein the sodium silicate and sulfuric acid are added simultaneously to the reactor over a period of from approximately 1.5 to 3 hours, wherein the volume ratio of sodium silicate to sulfuric acid is between 10 and 18 parts of sodium silicate to 1 part of sulfuric acid, and wherein the temperature and AZ alkalinity of the reaction mixture during the simultaneous addition are maintained substantially at the initial AZ alkalinity and temperature for from 0.25 to 1.5 hours.

19. The process of claim 18 wherein the precipitated silica produced is separated from the reaction mixture by filtration, washed with water until the conductivity of the wash liquor is from 500 to 1000 micro mhos/cm, and the washed precipitated silica is dried by spray drying.

* * * * *